(12) United States Patent
Edsall et al.

(10) Patent No.: US 7,911,950 B2
(45) Date of Patent: Mar. 22, 2011

(54) ADAPTER AND METHOD TO SUPPORT LONG DISTANCES ON EXISTING FIBER

(75) Inventors: Thomas James Edsall, Cupertino, CA (US); James R. Rivers, Saratoga, CA (US); Frederick Roland Schindler, Sunnyvale, CA (US); John Oberstar, San Jose, CA (US); Sandeep Arvind Patel, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 11/480,714

(22) Filed: Jul. 3, 2006

(65) Prior Publication Data

US 2008/0002761 A1    Jan. 3, 2008

(51) Int. Cl.
*H04J 1/16* (2006.01)

(52) U.S. Cl. ........ 370/232; 370/229; 370/230; 375/219; 375/222

(58) Field of Classification Search .......... 370/229–240; 398/1–214; 375/219, 222, 229–231; 709/230–233
See application file for complete search history.

(56) References Cited

U.S. PATENT DOCUMENTS

| | | | | |
|---|---|---|---|---|
| 6,600,755 | B1 * | 7/2003 | Overs et al. | 370/465 |
| 6,632,033 | B1 * | 10/2003 | Saleh et al. | 398/139 |
| 2004/0170128 | A1 * | 9/2004 | Takamichi | 370/245 |
| 2005/0069321 | A1 * | 3/2005 | Sullivan | 398/116 |
| 2006/0116844 | A1 * | 6/2006 | Gaur et al. | 702/130 |
| 2007/0086450 | A1 * | 4/2007 | Baumer et al. | 370/389 |
| 2007/0192505 | A1 * | 8/2007 | Dalmia | 709/233 |
| 2007/0230966 | A1 * | 10/2007 | Walsh | 398/155 |

OTHER PUBLICATIONS

IEEE Standards 802.3-2002, IEEE Computer Society, Mar. 8, 2002, 1538 pages total. (Uploaded in 3 files: pp. 1-500, pp. 501-1000, pp. 1001-1538.
IEEE Standard 802.3ae-2002, Amendment to 802.3-2002, "Part 3: CSMA/CD Access Method and Physical Layer Specifications", Aug. 30, 2002, 529 pages.
IEEE Standard 802.3-1998, Annex 31B, (Normative) "MAC Control PAUSE Operation" (802.3x Basic) 1998 Edition, 11 pages.
MacLeod, K., "Enhanced Flow Control for 802.3 Links Utilizing Extensions of 802.3x Flow Control", IEEE 802 Exec Study Group on QoS and Flow Control, Nov. 11, 1998, 11 pages.
Frazier, H., "The 802.3z Gigabit Ethernet Standard" IEEE Network, May/Jun. 1998, 2 pages.

(Continued)

*Primary Examiner* — William Trost, IV
*Assistant Examiner* — Charles C Jiang
(74) *Attorney, Agent, or Firm* — Weaver Austin Villeneuve & Sampson LLP

(57) ABSTRACT

Devices and methods are provided for enabling high-speed data communication at relatively low cost. Some methods allow devices to communicate by selecting a data transfer rate from among multiple data transfer rates. Some such methods allow devices to communicate according to the highest data transfer rate among multiple data transfer rates at which communications can be made without exceeding a predetermined error rate. Communications may be enabled between a first device operating at a relatively higher data transfer rate and a second device operating at a relatively lower data transfer rate. Pause frames or the like may be used to rate limit data received from the first device and maintain an average data transfer rate for communications with the second device at the lower data transfer rate.

19 Claims, 7 Drawing Sheets

OTHER PUBLICATIONS

Xenpak MSA Rev 3.0, "A Cooperation Agreement for 10 Gigabit Ethernet Transceiver Package", Issue 3.0, Sep. 18, 2002, 77 pages.
"Small Form-factor Pluggable (SFP) Transceiver MultiSource Agreement (MSA)", Cooperation Agreement for Small Form-Factor Pluggable Transceivers, Agilent Technologies, Blaze Products, E2O Communications, Inc. etc., Sep. 14, 2000, 38 pages.

* cited by examiner

ADAPTER AND METHOD TO SUPPORT LONG DISTANCES ON EXISTING FIBER

FIELD OF THE INVENTION

This invention relates generally to communication networks.

BACKGROUND OF THE INVENTION

As technology advances, devices can communicate at increasingly higher data rates. For example, many network devices (such as switches and routers) are currently being deployed with line cards having interfaces configured for operation at data rates of 10 Gbps, e.g., 10 Gbps Ethernet. Many offices, campuses and other enterprises have installed optical fiber for high-speed communication between networked devices.

Accordingly, optical uplinks (also referred to herein as adapters, optical interfaces or the like) must be provided for 10 Gbps Ethernet interfaces and optical fibers. However, adapters configured for 10 Gbps data rates are very expensive at present.

Existing infrastructure has relatively more multi-mode fiber ("MMF") than single-mode fiber ("SMF"). This disparity reflects a difference in price: MMF is less expensive than SMF. Connecting high data rate devices with MMF presents challenges, because of the relatively higher rates at which high frequencies are attenuated as compared with SMF.

It would be desirable to implement methods and devices that overcome at least some of the aforementioned shortcomings of the prior art.

SUMMARY OF THE INVENTION

The present invention provides various devices and methods for enabling high-speed data communication at relatively low cost. Some methods of the invention allow devices to communicate by selecting a data transfer rate from among multiple data transfer rates. Some such methods allow devices to communicate according to the highest data transfer rate among multiple data transfer rates at which communications can be made without exceeding a predetermined error rate.

Some embodiments of the invention are configured to allow communications between a first device operating at a relatively higher data transfer rate and a second device operating at a relatively lower data transfer rate. Pause frames or the like may be used to rate limit data received from the first device and maintain an average data transfer rate for communications with the second device at the lower data transfer rate.

Some implementations of the invention provide a method of controlling data rates. The method includes the following steps: performing a first autonegotiation procedure between a first device and a second device at a first data rate, at least one of the first device and the second device comprising an optical interface; transferring, after the first autonegotiation procedure, first data between the first device and the second device at a second data rate that is higher than the first data rate, the second data rate being a non-standard data rate; determining whether a bit error rate attained at the second data rate exceeds a predetermined threshold; and altering a data rate when it is determined that the bit error rate attained at the second data rate exceeds the predetermined threshold.

The method may also include these steps: receiving the first data by the first device from a third device at a third data rate higher than the second data rate; lowering an average data rate of data received by the first device from the third device from the third data rate to the second data rate; and forwarding the first data from the first device to the second device at the second data rate. For example, the first data rate may be 1 Gbps, the second data rate may be 4 Gbps and the third data rate may be 10 Gbps.

However, many other convenient rates may be used. For example, the first data rate may be 1 Gbps and the second data rate could be 4 Gbps.

The lowering step may involve sending IEEE 802.3x pause frames from the first device to the third device. The method may include the step of providing an indication to the third device that the first device can transmit data to, and receive data from, other devices at the third data rate. In one such example, the first data rate is 1 Gbps, the second data rate is 4 Gbps, the third data rate is 3 Gbps and the fourth data rate is 2 Gbps. Once again, many other convenient rates may be used.

The method of claim 1, wherein the altering step comprises reducing the data rate to a third data rate that is lower than the second data rate and higher than the first data rate. The method may also include the steps: determining whether a bit error rate attained at the third data rate exceeds the predetermined threshold; and reducing the data rate to a fourth data rate when it is determined that the bit error rate attained at the third data rate exceeds the predetermined threshold. In one such implementation, the first data rate is 1 Gbps, the second data rate is 4 Gbps and the third data rate is 3 Gbps. It will be appreciated that many other convenient rates may be used.

The method may include the step of encoding data differently, according to the data transfer rate. For example, the method may involve performing 8b/10b encoding for data transmitted at the first data rate and performing 64b/66b encoding for data transmitted at the second data rate.

The method can also include the steps of determining whether a temperature of the first device exceeds a predetermined threshold and taking corrective action when it is determined that the temperature of the first device exceeds the predetermined threshold. The corrective action may take many forms, such as lowering a data rate, de-activating the first device, etc.

The step of performing the autonegotiation procedure may be conducted according to the IEEE 802.3z standard. The method may also include the step of performing a second autonegotiation procedure between the first device and the second device at the first data rate, wherein the second autonegotiation procedure is performed after the determining step and prior to the altering step.

Some embodiments of the invention provide an adapter for a socket of a network device. The adapter includes the following elements: a first interface adapted for communication according to a 10 Gbps Ethernet standard; a second interface adapted for communication with a module having an optical transceiver; and a logic device. The logic device is configured to perform the following steps: perform, via the second interface, a first autonegotiation procedure between the adapter and a second device at a first data rate; transfer, after the first autonegotiation procedure, first data between the adapter and the second device at a second data rate that is higher than the first data rate; determine whether a bit error rate attained at the second data rate exceeds a predetermined threshold; and alter a data rate when it is determined that the bit error rate attained at the second data rate exceeds the predetermined threshold.

The logic device may also be configured to perform the following steps: receive the first data from the first interface at 10 Gbps; lower an average data rate of data received from the first interface from 10 Gbps to the second data rate; and forward the first data to the second device at the second data rate.

The foregoing methods, along with other methods of the present invention, may be implemented by software, firmware and/or hardware. For example, some methods of the present invention may be implemented by computer programs embodied in machine-readable media. Some aspects of the invention can be implemented by network devices or portions thereof, e.g., by individual optical interfaces for ports of a switch or a router.

DETAILED DESCRIPTION OF THE PREFERRED EMBODIMENTS

In this application, numerous specific details are set forth in order to provide a thorough understanding of the present invention. It will be apparent, however, to one skilled in the art, that the present invention may be practiced without some or all of these specific details. In other instances, well known process steps have not been described in detail in order not to obscure the present invention.

The present invention provides various devices and methods for enabling high-speed data communication. Although certain data rates, hardware, etc., will be used to explain various embodiments of the invention, no such limitations should be read into the claims. For example, while much of the discussion herein involves providing optical interfaces for 10 Gbps Ethernet ports, the invention is not limited to such contexts but instead has broad applicability.

Figure 1:
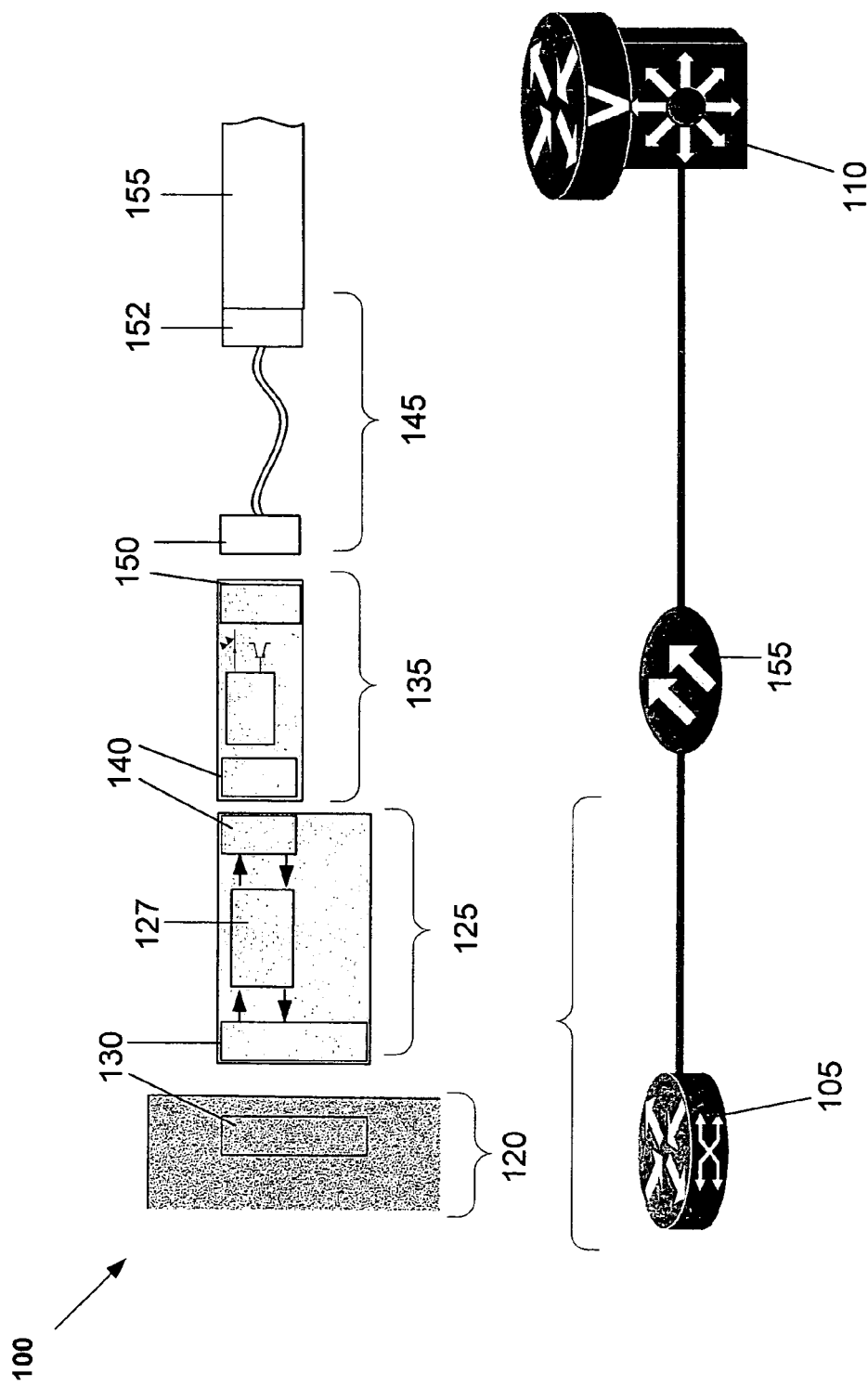
FIG. 1 illustrates some exemplary components of the present invention.

One specific embodiment will now be described with reference to FIG. 1. FIG. 1 illustrates a portion of network 100. Here, switch 105 is configured for communication with router 110 via and optical fiber 155. Switch 105 includes several ports configured for high-speed communication with other devices. In this example, switch 105 includes a plurality of X2 slots for this purpose, including X2 slot 120. The X2 specification draws from the electrical requirements of the 10 Gigabit Ethernet Receiver Package ("XENPAK") Multi-Source Agreement ("MSA") Issue 3.0 (Sep. 18, 2002), which is hereby incorporated by reference. The X2 specification is also based in part on the IEEE 802.3ae standard, which is also hereby incorporated by reference.

Many features of the present invention are provided by module 125, which is configured for communication with X2 slot 120 via interfaces 130. In this example, interfaces 130 are "XAUI" interfaces. The acronym "XAUI" is a concatenation of the Roman numeral X, meaning ten, and the initials of "Attachment Unit Interface." Clause 47 of the IEEE 802.3ae standard sets forth XAUI specifications. In preferred implementations of the invention, module 125 accepts module 135 and adapts module 135 to plug into X2 slot 120. Router 110 may have a corresponding X2 slot in communication with MMF 155 and may also have corresponding modules 125 and 135.

Logic device 127 provides much of the functionality of module 125. In this example, this functionality includes the ability to create a XAUI and an SFP interface, and to provide memory buffering, flow control and state machines that support different protocols. Here, logic device 127 is an ASIC. However, logic device 127 could be another type of logic device, such as a programmable logic device.

Module 135 may be any of various commercially available devices having an optical interface 150 that is configured for communication with an optical fiber. In this example, interfaces 150 and 152 are formed according to a standard optical connector form factor called MT-RJ, but any suitable interfaces may be used to implement the present invention. Similarly, in this example module 135 is a Fibre Channel ("FC") module built according to the electrical and mechanical standards of the *Small Form-Factor Pluggable* ("SFP") *Transceiver MultiSource Agreement* ("MSA"), (Sep. 14, 2000), which is hereby incorporated by reference. Accordingly, module 135 is sometimes referred to herein as an "SFP module" or simply an "SFP." However, other convenient form factors may be used. Modules 125 and 135 are connected by SFP interfaces 140. This adaptation permits an economical SFP to be used in conjunction with module 125.

However, other types of module 135 may be used. Other types of commercially available SFP modules could be used with module 125 of the invention. Module 135 does not need to operate according FC protocol, but instead could be, e.g., an Ethernet SFP module. Although the interface of module 125 must be compatible with that of module 135, it is not essential that the interfaces be SFP interfaces.

Many currently-deployed SPF modules use an 850 nm laser. However, it has been observed that MMF typically exhibits losses of 4 to 6 dB per kilometer (a 60% to 70% loss per kilometer) at a wavelength of 850 nm. When the wavelength is increased to approximately 1300 nm, the loss drops to about 3 to 4 dB (50% to 60%) per km.

Therefore, while SFP modules having 850 nm lasers are readily available and relatively inexpensive, it is preferable that the SFP module 135 includes a longer-wavelength laser (e.g., a 1310 nm laser) instead of an 850 nm laser. If a 1310 nm laser is used in the SFP module, relatively more consistent performance is gained for various optical path lengths even when the invention is implemented using relatively low-quality installed MMF.

In this example, optical fiber 155 is MMF, but various alternative implementations of the invention involve communication via SMF. When using MMF, mode conditioning patch cord (MCP) 145 preferably forms a connection between SFP module 135 and MMF 155. The specification of MCP 145 depends in part on the core diameter of MMF 155. If SMF is used for communication with other devices, the SMF may be plugged directly into module 135.

Figure 2:
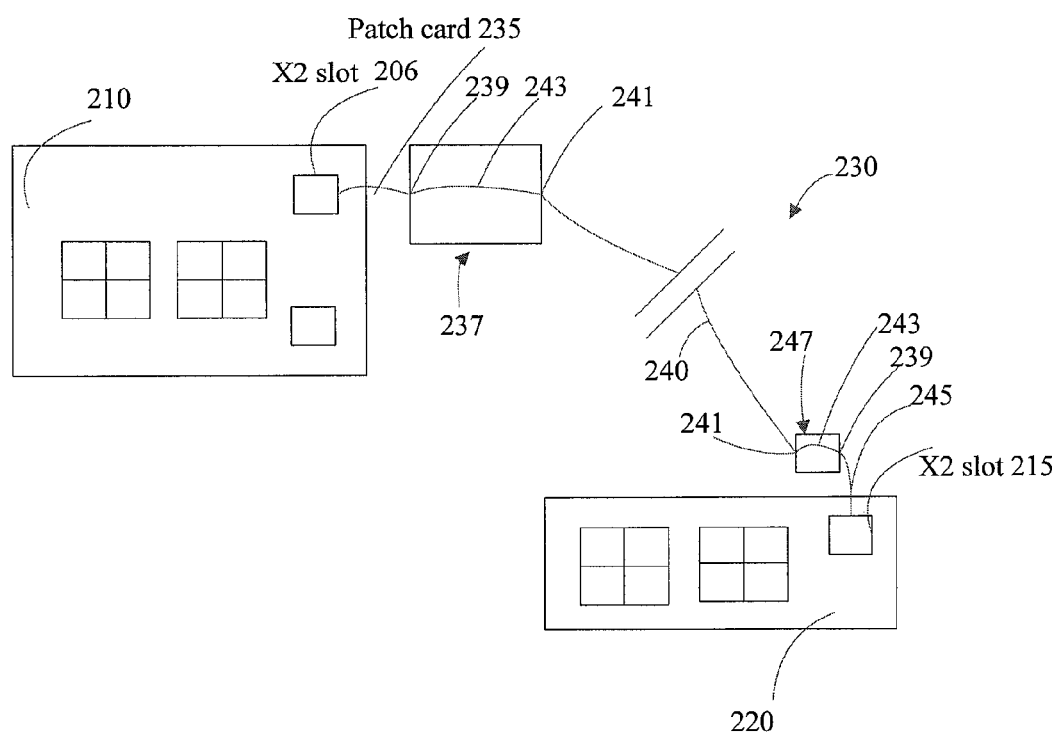
FIG. 2 illustrates devices that may be used for implementing some methods of the invention.

FIG. 2 provides additional context for the previously-described features. Here, X2 slot 205 of network device 210 is in communication with X2 slot 215 of network device 220 via optical connection 230. Network devices 210 and 220 could be switches, routers, or other network devices having X2 slots. Optical connection 230 includes relatively short patch cords 235 and 245, and relatively longer MMF 240. Patch cords 235 and 245 offset the laser beams from the center of MMF 240. Patch panels 237 and 247 include connectors 239 and 241, which are configured for communication via internal fiber 243. The type of cable used for fiber 243 should match the type used for cable 240. In this example, patch cords 235 and 245 are approximately 1 meter long, whereas MMF 240 may range from a few meters to 300 meters or more. Here, modules 125 and 135 (not shown) are disposed within each of X2 slot 205 and X2 slot 215, allowing patch cords 235 and 245 to be plugged into corresponding modules 135.

Figure 3:
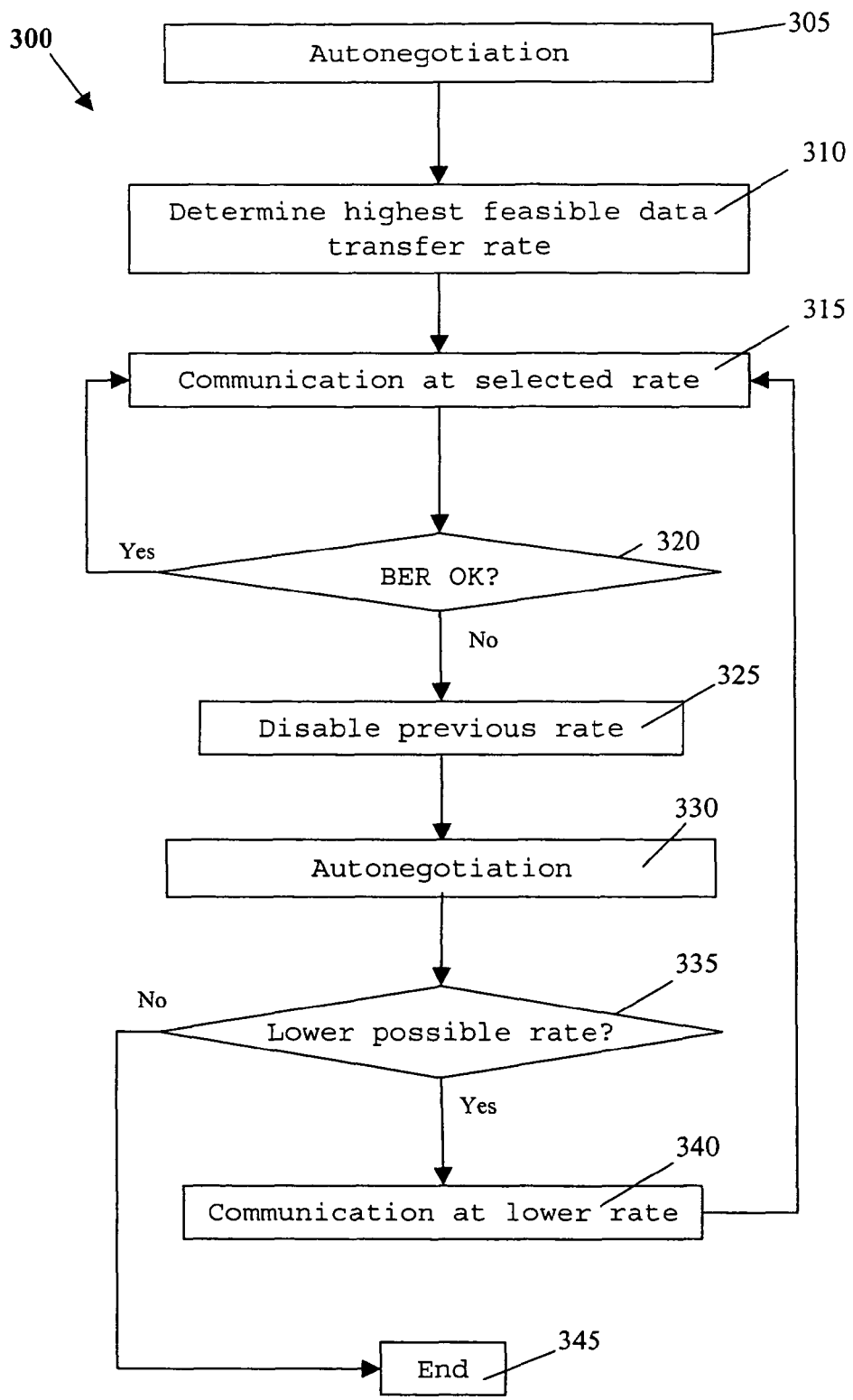
FIG. 3 is a flow chart that outlines some methods of the invention.

Some methods of the invention allow devices to negotiate different data communication rates and to change an established communication rate if the results are not satisfactory. FIG. 3 is a flow chart that outlines one such method 300 of the invention. In step 305, the system initializes and autonegotiation is performed between a module 125 and another device. In this example, autonegotiation is performed between a module 125 of X2 slot 205 (see FIG. 2) and one or more components of an optical interface of X2 slot 215.

According to some implementations of the invention, a module 125 and/or module 135 may be interrogated and/or authenticated in step 305. U.S. patent application Ser. No. 09/927,999, entitled "Methods and Apparatus for Verifying Modules from Approved Vendors" and filed Aug. 10, 2001, describes relevant procedures and is hereby incorporated by reference. Capabilities of one or both modules could subsequently be enabled or disabled accordingly. For example, SFP module 135 could be interrogated by X2 slot via module 125 (or by module 125 itself) to determine the capabilities of module 135.

In some implementations of the invention, module 125 is configured to "spoof" a port of a network device such that module 125 appears to be capable of transmitting and receiving data from optical connection 230 (see FIG. 2) at a higher data transfer rate than that at which module 125 is actually capable of operating. For example, module 125 may be configured to transmit data via optical connection 230 at approximately 4 Gbps, but may indicate to the network device that it is capable of operation at 10 Gbps. The initial "handshake" between module 125 and the network device could be performed at 10 Gbps, but after normal operation begins, data will be transmitted on, and received from, the fiber at a maximum of approximately 4 Gbps. Such implementations allow such modules 125 to work in a larger number of X2 slots. One drawback of such spoofing is that a network device may determine that module 125 has high-speed interface when it does not, and select the data path through module 125 as a high-speed data path.

Although the autonegotiation may be performed in any convenient manner, in this example the autonegotiation is performed at 1 Gbps according to IEEE 802.3z. The 1000BASE-X auto-negotiation procedure described in IEEE 802.3 clause 37 may be used in order to provide auto-negotiation capabilities for the approximate data rates of 1, 2, 3, and 4-Gbps. All autonegotiation may be performed using the autonegotiation state diagram provided in IEEE 802.3 figure 37-6. The Config_Reg base page sent indicates the 1 Gbps abilities and that a next page is available. A link partner that indicates its ability to support next pages is sent a message next page using the format shown in clause 37.2.4.3.1, figure 37-3. Message code #5 (28C.6) may be used to identify products (e.g., Cisco products) and to transfer extended capabilities of module 125. An ACK2 response is requested to confirm that the link partner has received and can act upon the message "next page sent." The extended capability details may be provided, for example, in the header of message code #5. The POR default for auto-negotiation may be determined by a field within a configuration register of an ASIC (or the like) of module 125.

After the capabilities of the other device or devices have been established in step 305, a highest feasible data transfer rate is determined. (Step 310.) If, for example, it is determined that the an optical interface of X2 slot 215 includes a module 125 according to some preferred implementations of the invention, a highest feasible data transfer rate is determined to be 4 Gbps according to header information of message code #5. The capabilities of module 135 may also be evaluated in step 310. The module 135 may be rated to operate at one data rate, but may be capable of operation at a higher data rate. For example, one implementation of module 135 known as an LX module is sold as a 1 Gbps device, but may operate satisfactorily at 3 Gbps.

Other data rates may be evaluated and established. For example, there are also standards for FC at 8 Gbps, so for some modules 135, 8 Gbps may be the highest rate. According to some implementations of the invention, if the device does not provide extended capabilities, a default data transfer rate is applied (e.g., 1 Gbps).

In step 315, communication is established between devices 210 and 220 at the selected data transfer rate. In some instances, as here, the data transfer rate is a non-standard data transfer rate. Accordingly, some implementations of the invention provide methods for implementing data communication at non-standard data transfer rates. In some such implementations, the state machines from IEEE 802.3ae, clause 49 (10 GBASE-R) are used to help define the physical coding sublayer ("PCS"). In some implementations, negotiated rates at 1 Gbps are 8b/10b encoded, but negotiated rates above 1 Gbps (e.g., at 2 Gbps, 3 Gbps or 4 Gbps) are 64b/66b encoded.

In this implementation all rates and timer limits for 10 Gbps operation are scaled according to the formula rateScale=10/setRate, where setRate is the negotiated data transfer rate in Gbps. In this example, the initial setRate is 4 Gbps, so limits for 10 Gbps have rates that are scaled by a factor of 4/10 and all timer periods are scaled by a factor of 10/4.

After communication is established between devices 210 and 220 at the selected data transfer rate, the communication should be evaluated. (Step 340.) In method 300, this evaluation is performed by periodically (or continuously) determining the bit error rate ("BER").

It may be the case, for example, that a module 125 of X2 slot 205 could have a satisfactory communication with a corresponding module 125 of X2 slot 215 with certain implementations, but not others. Important factors include the wavelength of the laser used in the corresponding SPF module (or the like), the quality of fiber used in optical path 230 between X2 slots 205 and 215 and the length of this fiber. For example, if the optical path 230 between X2 slots 205 and 215 is primarily MMF and exceeds 300 meters, communication at a data transfer rate of 4 Gpbs using an 850 nm laser may not be possible at an acceptable BER. However, communication at 4 Gpbs may be possible at an acceptable BER if a shorter length of MMF cable were used, if SMF were used instead of MMF, or if a longer-wavelength laser were used.

The predetermined BER threshold may (or may not) be different for different data transfer rates, according to the implementation. For example, if the predetermined threshold is measured in errors per unit of time, the predetermined threshold may be scaled according to the data transfer rate. In such implementations, a consistent threshold may be established in terms of errors per a predetermined number of data units, regardless of the data transfer rate.

In one such example, the BER monitor state machine of IEEE 802.3ae, clause 49 is used with the rateScale factor taken into account. That is, the 10 GBASE-R 125 μS timer is increased (multiplied by) the rateScale factor. The BER heuristic that results is as follows:

$$BER = \left| \frac{16}{\frac{10 \times 10^9}{rateScale} \times 125 \times 10^{-6} \times rateScale \times \frac{2}{66}} \right| \quad \text{(Equation 1)}$$

According to Equation (1), the BER is estimated by counting 16 invalid synch-headers (2 bits) within 66 bits of encoded data. The errors are counted over a 125 μS period that is rateScaled. In this example, a BER greater than $4 \times 10^{-4}$ is reported as HI_BER in an appropriate register. When HI_BER occurs for ber_threshold counts, a HI_BER indication has been present for rateScale×125×10⁻⁶×ber_threshold seconds. However, it will be appreciated that various alternative methods of evaluating communication quality, including but not limited to alternative methods of determining a BER, different BER thresholds, may be used to implement the present invention.

If the BER is acceptable, communication is maintained at the current data transfer rate. (Step 315.) However, if the BER exceeds a predetermined threshold, communication will be established at a lower data transfer rate, if such a rate is feasible. In this example, the BER exceeds a predetermined threshold when data are transferred at the current data transfer rate. Therefore, the current data transfer rate is disabled (step 325), e.g., by removing the current data transfer rate from a list of potentially useable rates. Another autonegotiation is then performed, at 1 Gbps according to IEEE 802.3z in this example.

It is then determined (step 335) whether there is a lower data transfer rate that is supported by the devices (here, modules 125). If there is no lower data transfer rate that is supported, the process ends. (Step 345.) However, if a lower data transfer rate is supported, that rate will be selected (step 340) and communication at the lower rate will be negotiated and established. (Step 315.) If 2 or more lower data transfer rates are supported, the highest data transfer rate among the supported data transfer rates will be selected first. In this example, modules 125 are capable of communicating at a data transfer rate of 3 Gbps, so communication at this lower data transfer rate will be negotiated and established in step 315.

The BER is evaluated for the new, lower data transfer rate in step 320. Communication will continue at this rate unless the BER exceeds a predetermined threshold. According to some implementations of the invention, the data transfer rate could be further reduced to 2 Gpbs if the BER exceeds a predetermined threshold for communication at a data transfer rate of 3 Gbps. Similarly, the data transfer rate could be still further reduced to 1 Gpbs if the BER exceeds a predetermined threshold for communication at a data transfer rate of 2 Gbps.

Network devices often have a number of X2 slots disposed close to one another. Moreover, some implementations of the invention provide for components (e.g., module 135) to be operated at a higher data transfer rate than their advertised rate. Accordingly, it is possible that in some circumstance, the X2 slots and associated modules could become overheated. It would be desirable to determine whether components are becoming too hot to operate properly and therefore whether corrective action should be taken.

Figure 4:
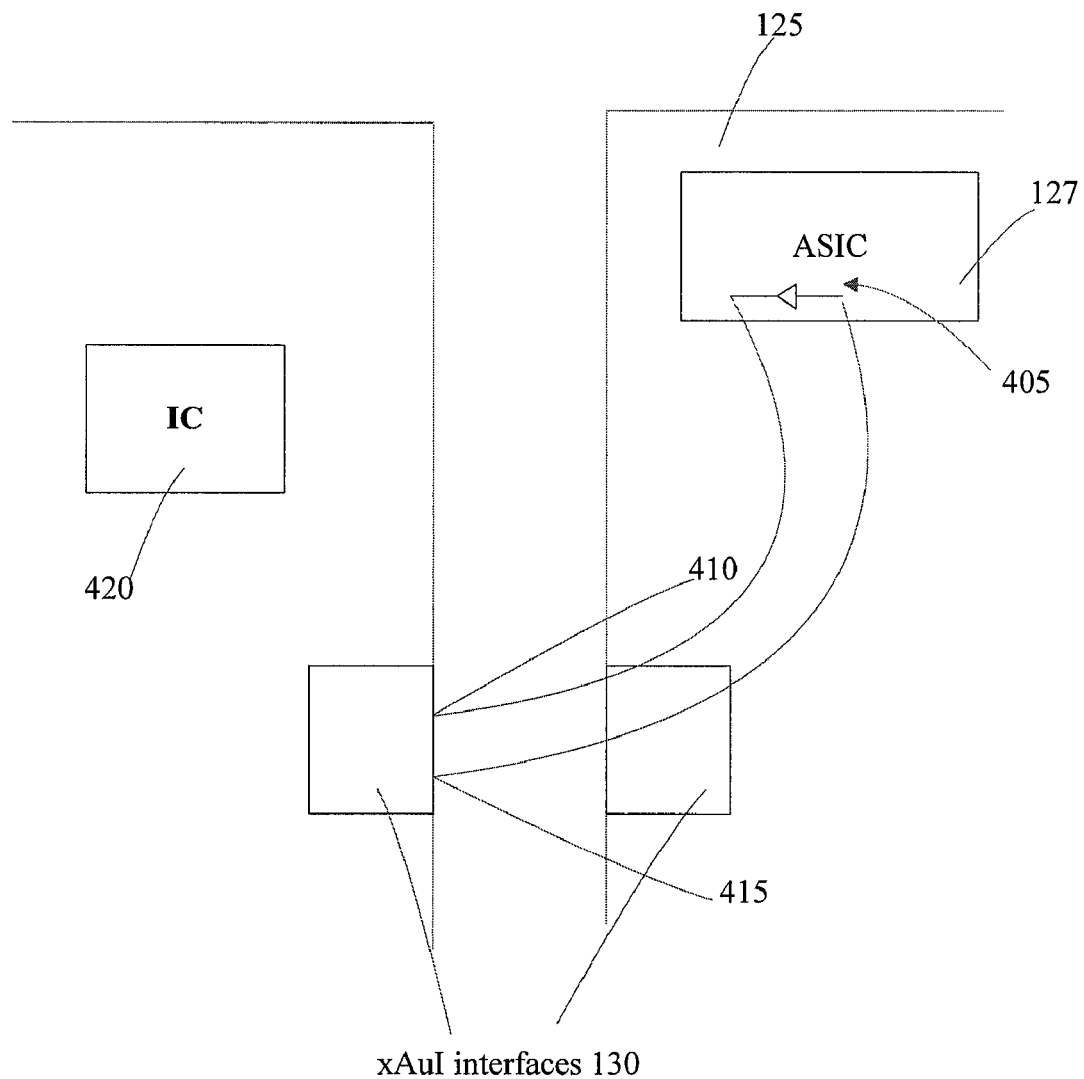
FIG. 4 is a block diagram that shows some details of a module according to the invention.

An implementation of the invention that addresses such issues will now be described with reference to FIGS. 4 and 5. FIG. 4 is a block diagram that shows some additional details of a module 125 according to one embodiment of the invention. In this embodiment, logic device 127 includes temperature sensor 405, which is a thermal diode in this example. Here, temperature sensor 405 is connected to dedicated pins 410 and 415 of interface 130, which is a XAUI interface in this instance. IC 420 is configured to interrogate the thermal diode and determine a temperature of module 125. Because logic device 127 generates most of the heat of module 125, the temperature of logic device 127 should indicate a maximum temperature for module 125.

Figure 5:
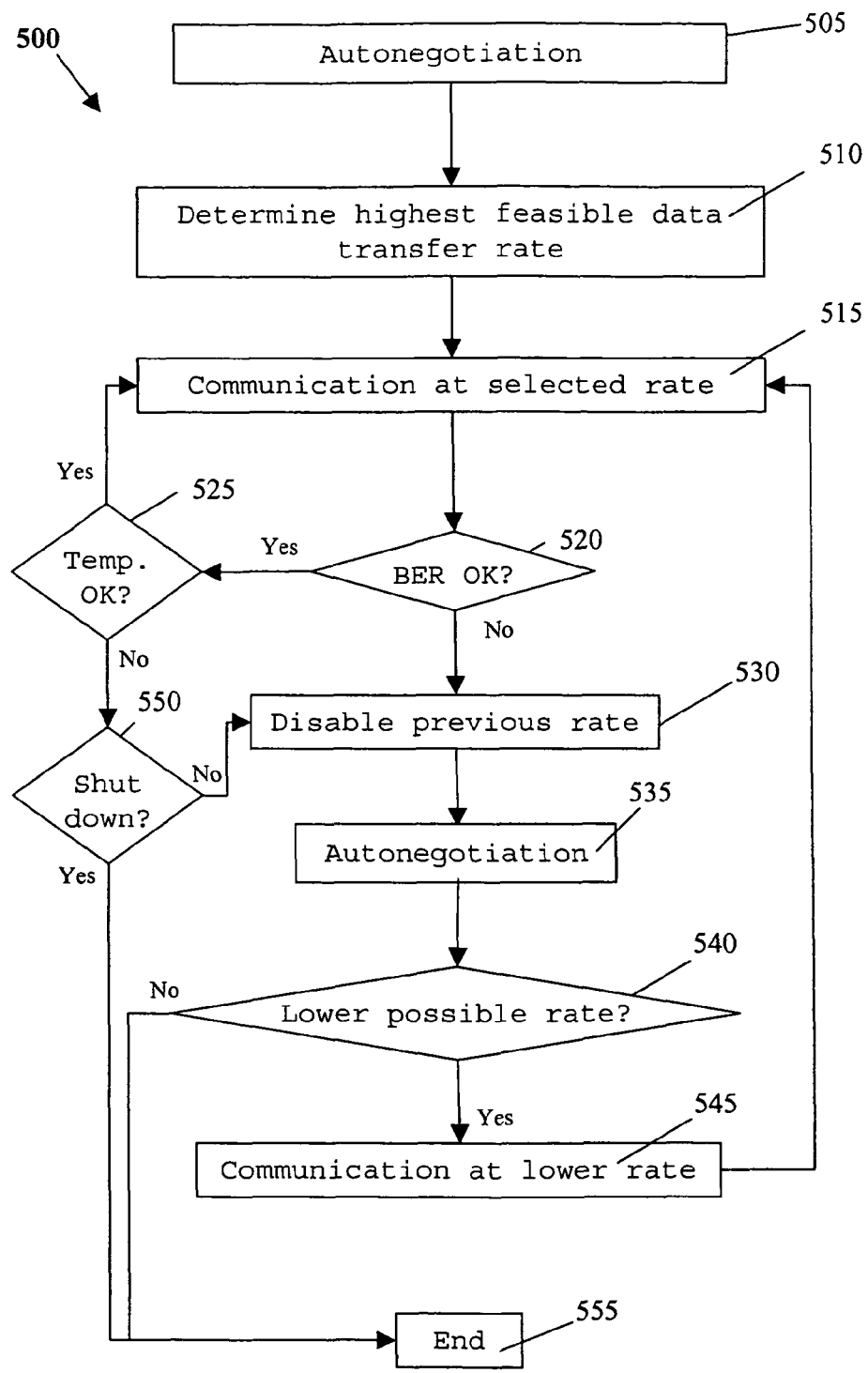
FIG. 5 is a flow chart that outlines alternative methods of the invention.

FIG. 5 is a flow chart that outlines method 500 of the invention for using components such as those illustrated in FIG. 4. Steps 505 through 515 of method 500 correspond with steps 305 through 315 of method 300 and are described above. Similarly, steps 530 through 545 of method 500 correspond with steps 325 through 340 of method 300. Accordingly, these corresponding steps of method 500 will not be described again here.

However, when it is determined in step 520 that the BER is acceptable, it is then determined (in this example, by IC 420) whether the temperature of logic device 127 (or, in alternative implementations, the rate of temperature increase) is below a predetermined threshold. If so, communication continues at the selected rate. (Step 515.)

However, if it is determined in step 525 that the temperature (and/or the rate of temperature increase) of logic device 127 exceeds a predetermined threshold, some form of corrective action will be taken. It is determined in step 550 whether the temperature indications are severe enough to warrant a shut down. If so, the operation of module 125 ends. If it is determined that the temperature indications are less severe, the method proceeds to step 530. The previous data transfer rate of module 125 is disabled and a lower data transfer rate is established, if feasible.

Figure 6:
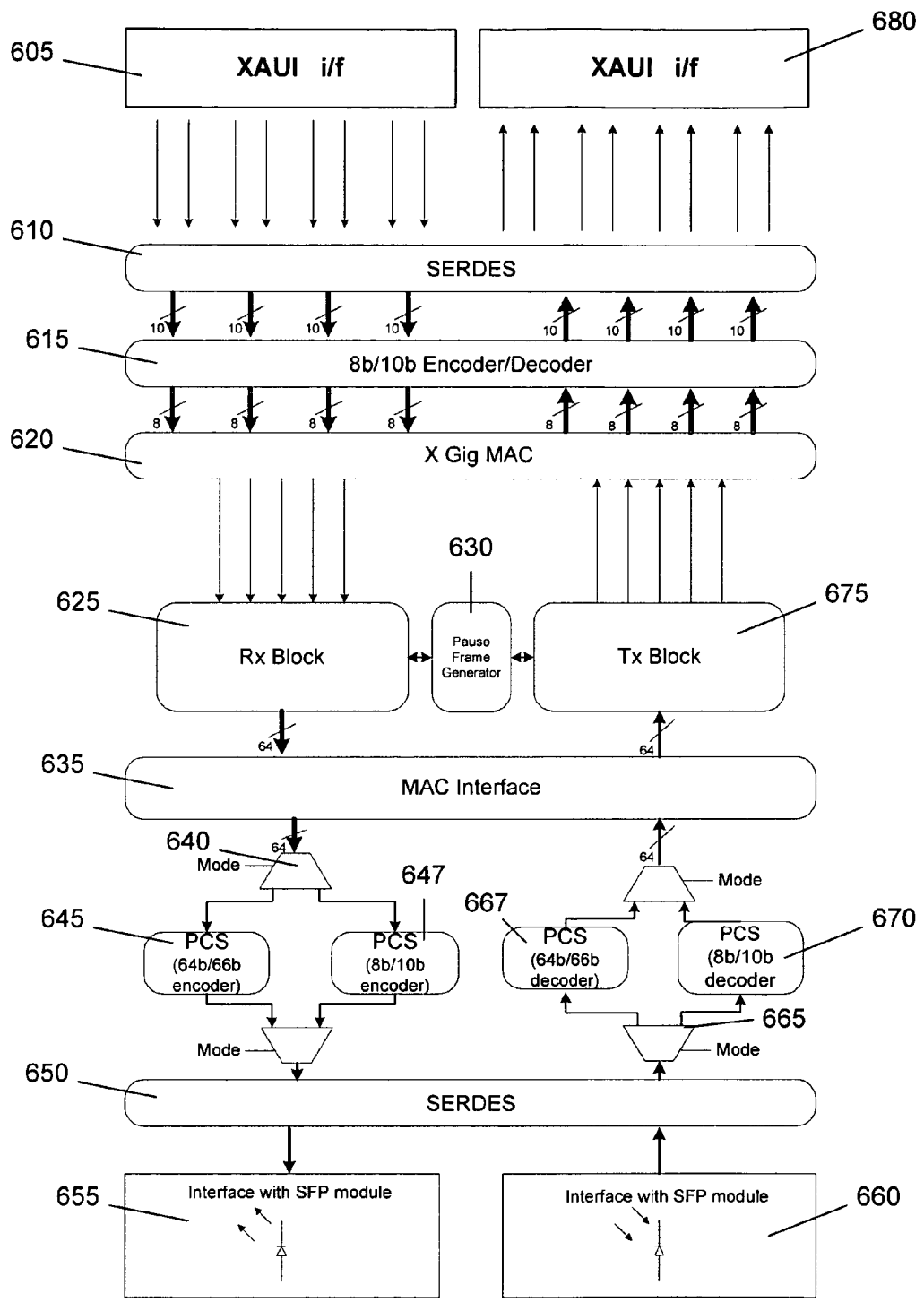
FIG. 6 illustrates data flow and operations of a module according to some methods of the invention.

FIG. 6 illustrates data flow and operations of a module 125 according to some implementations of the invention. The operations indicated in FIG. 6 may be performed by a logic device such as ASIC 127 of FIG. 1. It will be appreciated by those of skill in the art that the implementation details described with regard to FIG. 6 (and all other such details described herein), including but not limited to data path widths, data rates, numbers of data lanes, etc., are merely illustrative.

In this example, module 125 receives data from a XAUI interface of an X2 slot that is in communication with XAUI interface 605. Serializer/deserializer ("SERDES") 610 receives these serial data and outputs corresponding 10b data in parallel. 8b/10b encoder/decoder 615 decodes these 10b parallel data and outputs 8b parallel data to 10 Gbps media access controller ("MAC") 620. 10 Gbps MAC 620 provides higher-level parsing of received frames and outputs 4 lanes of 8b data and one lane of control data (primarily for handshaking) to receiver block 625.

Receiver block 625 provides buffering (e.g., via a FIFO ring) and flow control functions, in cooperation with flow control module 630. These flow control functions allow data to be received from XAUI interface 605 at a higher rate than data are being sent from module 125 to module 135. In some implementations of the invention, these flow control functions are based on a threshold buffer occupancy. According to such implementations, when the occupancy of the buffer exceeds the threshold buffer occupancy, flow control module 630 causes an indication to be sent to the X2 slot that the data flow to SERDES 610 should be temporarily slowed or stopped. In this example, flow control module 630 generates one or more pause frames according to the IEEE 802.3x standard, which is hereby incorporated by reference. Flow control module 630 causes transmission block 675 to send the pause frames to the X2 slot via XAUI interface 680.

Receiver block provides data to MAC interface 635 via a 64-bit wide data path in this example. The data path width may be designed according to the requirements of MAC interface 635. Preferably, MAC interface 635 is configured for operation at different data transfer rates, e.g., at 1, 2, 3, 4, 5, 8 and/or 10 Gbps. In this example, MAC interface 635 is configured for operation at 1, 2, 3 or 4 Gbps. Having a data path twice as wide coming out of receiver block 625 as the data path entering receiver block 625 partially compensates for receiving data from the X2 slot at a higher rate.

If mode selector 640 selects 64b/66b encoding and encoder 645 implements such encoding, this configuration allows the highest data transfer rate (4 Gbps) to be compliant with the 4.25 Gbps optics standard used by some FC SFP modules. In some such implementations of the invention, mode selector 640 selects 8b/10b encoding for operation at 1 Gbps and selects 64b/66b encoding for operation at 2, 3 or 4 Gbps. SERDES 650 serializes these data via interface 655 for transmission via an SFP module or the like.

The foregoing processes are performed in reverse order for data arriving from interface 660. SERDES 650 translates the arriving serial data to parallel. Mode selector determines whether to forward these data to decoder 667 or decoder 670, depending on whether the arriving data are 10b or 66b. MAC interface 635 provides the data to transmission block 675 on a 64-bit data path, which provides the data to 10 Gbps MAC 620 on 4 8-bit data lanes. 8b/10b Encoder/decoder encodes the 8-bit data as 10-bit data. SERDES serializes the data and provides it to the X2 slot via XAUI interface 680.

Figure 7:
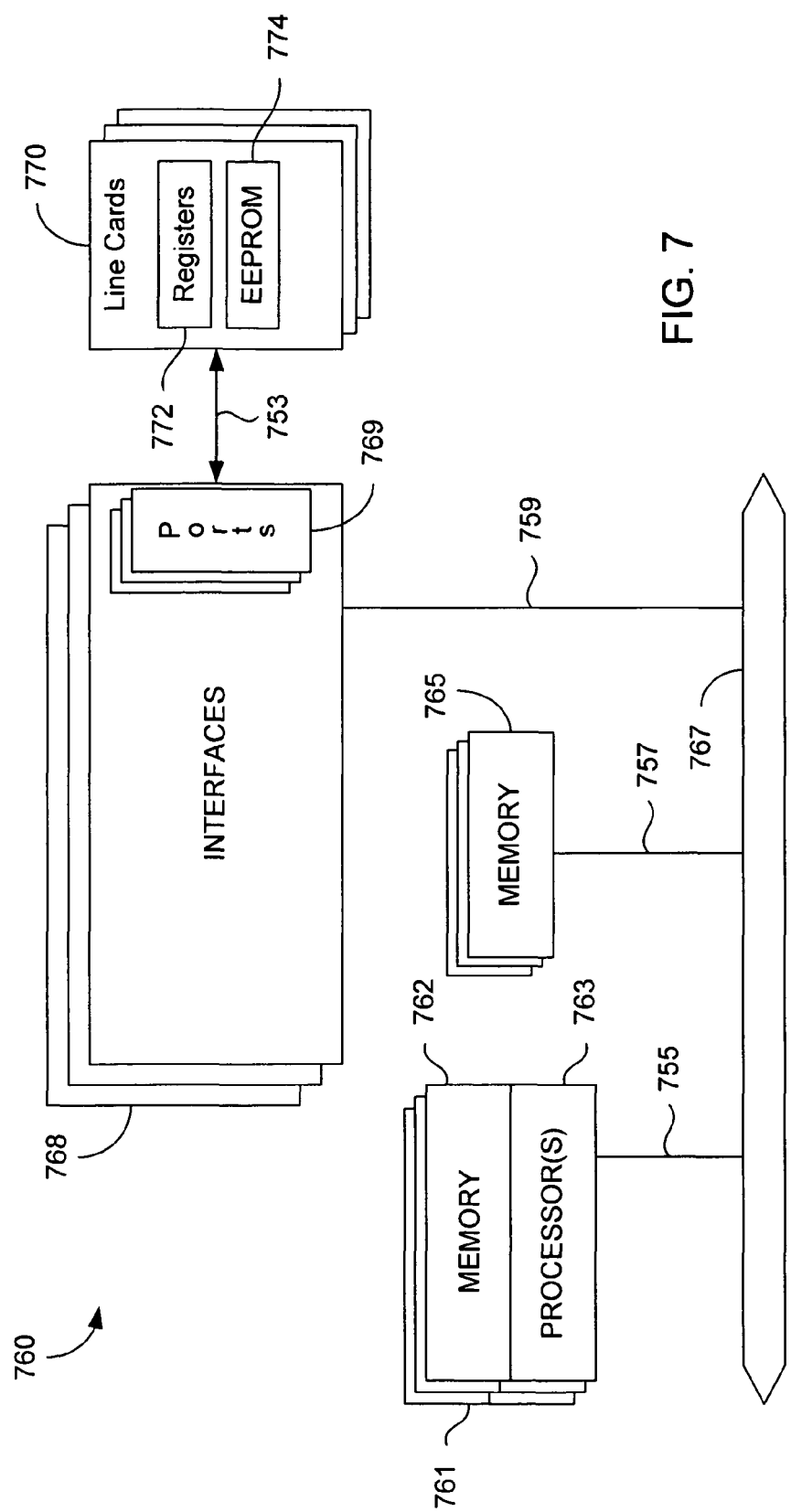
FIG. 7 is a network device that may be configured to implement some aspects of the invention.

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "line cards"). Generally, interfaces 768 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g. Linux, VxWorks, etc.), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 7) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method of controlling data rates, the method comprising:

performing a first autonegotiation procedure between a first device and a second device at a first data rate, at least one of the first device and the second device comprising an optical interface;

transferring, after the first autonegotiation procedure, first data between the first device and the second device at a second data rate that is higher than the first data rate, the second data rate being a non-standard data rate;

determining whether a bit error rate attained at the second data rate exceeds a predetermined threshold;

altering a data rate when it is determined that the bit error rate attained at the second data rate exceeds the predetermined threshold, wherein the altering step comprises reducing the data rate to a third data rate that is lower than the second data rate and higher than the first data rate;

determining whether a bit error rate attained at the third data rate exceeds the predetermined threshold; and reducing the data rate to a fourth data rate when it is determined that the bit error rate attained at the third data rate exceeds the predetermined threshold.

2. The method of claim 1, wherein the first data rate is 1 Gbps and the second data rate is 4 Gbps.

3. The method of claim 1, further comprising the step of performing 8b/10b encoding for data transmitted at the first data rate.

4. The method of claim 1, further comprising the step of performing 64b/66b encoding for data transmitted at the second data rate.

5. The method of claim 1, further comprising:
determining whether a temperature of the first device exceeds a predetermined threshold; and
taking corrective action when it is determined that the temperature of the first device exceeds the predetermined threshold.

6. The method of claim 5, wherein the step of taking corrective action comprises lowering a data rate.

7. The method of claim 5, wherein the step of taking corrective action comprises de-activating the first device.

8. The method of claim 1, wherein the step of performing the autonegotiation procedure is conducted according to the IEEE 802.3z standard.

9. The method of claim 1, further comprising the step of performing a second autonegotiation procedure between the first device and the second device at the first data rate, wherein the second autonegotiation procedure is performed after the determining step and prior to the altering step.

10. The method of claim 1, wherein the first data rate is 1 Gbps, the second data rate is 4 Gbps and the third data rate is 10 Gbps.

11. The method of claim 1, wherein the lowering step comprises sending IEEE 802.3x pause frames from the first device to the third device.

12. The method of claim 1, further comprising the step of providing an indication to the third device that the first device can transmit data to, and receive data from, other devices at the third data rate.

13. The method of claim 12, wherein the first data rate is 1 Gbps, the second data rate is 4 Gbps, the third data rate is 3 Gbps and the fourth data rate is 2 Gbps.

14. The method of claim 1, wherein the first data rate is 1 Gbps, the second data rate is 4 Gbps and the third data rate is 3 Gbps.

15. An apparatus comprising:
means for performing a first autonegotiation procedure between a first device and a second device at a first data rate, at least one of the first device and the second device comprising an optical interface;

means for transferring, after the first autonegotiation procedure, first data between the first device and the second device at a second data rate that is higher than the first data rate, the second data rate being a non-standard data rate;

means for determining whether a bit error rate attained at the second data rate exceeds a predetermined threshold;

means for altering a data rate when it is determined that the bit error rate attained at the second data rate exceeds the predetermined threshold, wherein the data rate is altered such that it is reduced to a third data rate that is lower than the second data rate and higher than the first data rate;

means for determining whether a bit error rate attained at the third data rate exceeds the predetermined threshold; and means for reducing the data rate to a fourth data rate when it is determined that the bit error rate attained at the third data rate exceeds the predetermined threshold.

16. An apparatus comprising:
a processor; and
a memory, at least one of the processor or the memory being adapted for:
performing a first autonegotiation procedure between a first device and a second device at a first data rate, at least one of the first device and the second device comprising an optical interface;

transferring, after the first autonegotiation procedure, first data between the first device and the second device at a second data rate that is higher than the first data rate, the second data rate being a non-standard data rate;

determining whether a bit error rate attained at the second data rate exceeds a predetermined threshold;

altering a data rate when it is determined that the bit error rate attained at the second data rate exceeds the predetermined threshold;

receiving the first data by the first device from a third device at a third data rate higher than the second data rate;

lowering an average data rate of data received by the first device from the third device from the third data rate to the second data rate; and forwarding the first data from the first device to the second device at the second data rate.

17. A non-transitory computer-readable medium storing thereon computer-readable instructions for controlling at least one device to do the following:

performing a first autonegotiation procedure between a first device and a second device at a first data rate, at least one of the first device and the second device comprising an optical interface;

transferring, after the first autonegotiation procedure, first data between the first device and the second device at a second data rate that is higher than the first data rate, the second data rate being a non-standard data rate;

determining whether a bit error rate attained at the second data rate exceeds a predetermined threshold;

altering a data rate when it is determined that the bit error rate attained at the second data rate exceeds the predetermined threshold;

receiving the first data by the first device from a third device at a third data rate higher than the second data rate;

lowering an average data rate of data received by the first device from the third device from the third data rate to the second data rate; and forwarding the first data from the first device to the second device at the second data rate.

18. The non-transitory computer-readable medium of claim 17, wherein at least one of the first device or the second device are incapable of performing a data transfer at the first data rate.

19. The non-transitory computer-readable medium of claim 17, wherein the first device transmits a communication that indicates that it is capable of performing a data transfer at the first data rate, wherein the first device is incapable of performing a data transfer at the first data rate, thereby enabling the first autonegotiation procedure to be performed at the first data rate.

* * * * *